July 8, 1969   W. KLEIN   3,454,321
PANCRATIC OPTICAL SYSTEM
Filed Nov. 10, 1964

INVENTOR:
WALTER KLEIN

BY

AGENT

United States Patent Office 3,454,321
Patented July 8, 1969

3,454,321
PANCRATIC OPTICAL SYSTEM
Walter Klein, Wissmar, kreis Wetzlar, Germany, assignor to Ernst Leitz G.m.b.H. Optische Werke, Wetzlar, Germany, a company of Germany
Filed Nov. 10, 1964, Ser. No. 410,185
Claims priority, application Germany, Nov. 20, 1963,
L 46,388
Int. Cl. G02b 7/02, 15/00, 9/34
U.S. Cl. 350—43                                    3 Claims Pancratic optical systems are basically divided into two different structural types, namely those employing so-called mechanical correction and those employing optical correction.

Optical correction is achieved by adjustment of the positions of rigidly coupled lens components having refractive powers of the same sign, relative to the positions of stationary components having refractive powers of opposite signs. Such adjustment causes a displacement, or meandering of the image plane, the number of traversals of the null plane being dependent upon the number of components used. A known variant of this latter system involves the adjustment, relative to each other, of at least two components having refractive powers of opposite signs. There, too, the above-mentioned displacement, or meandering of the image plane takes place.

It is, accordingly, a principal object of this invention to provide an optical system of the type characterized above in which the displacement of the image plane is lessened.

This and other objects which will appear are accomplished by means of a pancratic optical system which differs from that described above in that two components having refractive powers of the same sign are adjusted relative to each other in such a manner that one component is adjusted in the magnification range of about 1:1, while the other is adjusted in the vicinity of the image plane.

This construction has the great advantage that the height relationships $(h_r:h_1)$ of a ray emanating from the center of the object remain about equal, or, to put it differently, that the section length of such a ray does not change sign after every lens component. It is known that this type of imaging in an optical system gives rise to serious difficulties in the correction of image aberrations.

To prevent dirt on the lens surface of the adjustable component nearest the image plane, such as dust which may settle there, from becoming visible, the second component preferably consists of two rigidly interconnected individual components. Care should be taken, in such an arrangement, that the desired adjustments of the principal planes H and H' take place in or near the image plane.

In such pancratic systems, two linear adjustments create only slight displacements of the image plane. Of course, it is also possible to eliminate such displacements entirely by adjusting one of the lens components along a curved path. This curve then remains comparatively simple. This does not affect the principal advantage of the invention, which, for this construction and suitable adjustment ranges, resides in the elimination of difficulties in the correction of image aberrations.

Of course, such pancratic systems can also be coupled to additional, stationary lens components, in order to adapt them to particular applications.

In Tables 1 and 2 below are given two examples of such systems, which are suitable for photography as well as for other purposes.

In a simple system, consisting of only two components, in which even the second component is constituted by a single element, cemented if necessary, the refractive powers and the spacings of the individual components relative to each other should preferably be chosen so as to fall approximately within the following boundaries.

TABLE 1

| | |
|---|---|
| $0.15l < f_1 < 0.35l$ | $0.3l < l_0 < 0.92l$ |
|  | $0 < l_1 < 0.7l$ |
| $0.1l < f_2 < 0.5l$ | $0 < l_b < 0.3l$ | where
$f_1$ are the focal lengths,
$l_1$ the spacings, and
$l$ the spacing between the object and image plane of the system.

In an improved system, in which the second component consists of two individual elements rigidly connected to each other, the limits indicated in Table 2 are preferably maintained.

TABLE 2

| | |
|---|---|
| $0.15l < f_1 < 0.35l$ | $0.3l < l_0 < 0.85l$ |
| $0.4l < f_{2a} < l$ | $0 < l_1 < 0.75l$ |
| $0.4l < f_{2b} < l$ | $0.1l < l_4 < 0.5l$ |
|  | $0 < -l_b < 0.5l$ |

The symbols in Table 2 correspond to those employed in Table 1, bearing in mind, however, that the additional subscripts $a$ and $b$ denote, respectively, the individual focal lengths of the two individual elements of the second lens component.

For further details, reference may be had to the description which follows in the light of the accompanying drawings, wherein.

Figure 1:
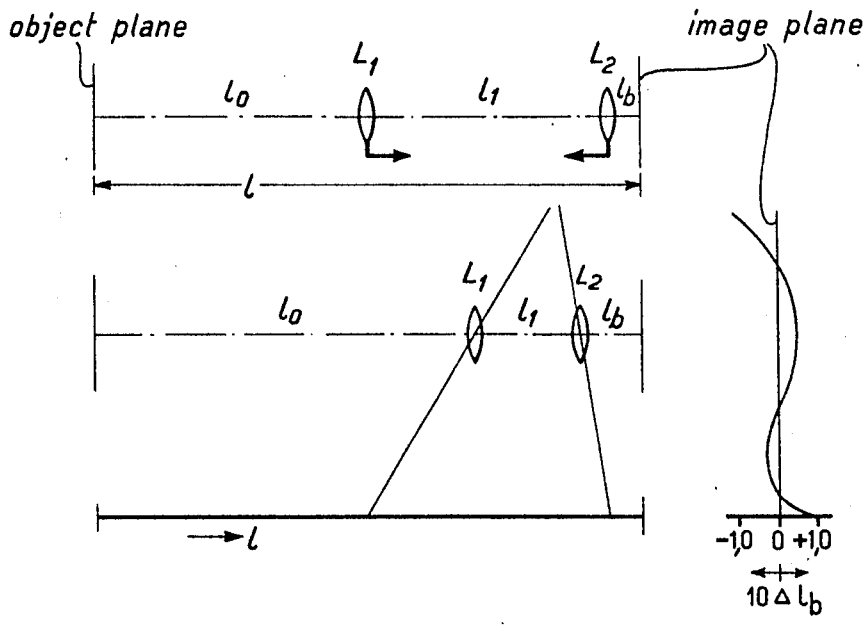
FIGURE 1 shows a simple pancratic system in accordance with the invention.

In FIGURE 1, to which reference may be had, there are schematically represented in the upper portion two positive optical components displaceable relative to each other in the directions indicated by the respective arrows. Spacings $l_0$, $l_1$, and $l_b$ are indicated. Of these, $l_0$ denotes the spacing between the first lens component, in its initial or starting position, and the object plane, while $l_b$ denotes the spacing between the second lens component also in its initial position, and the image plane.

The lower portion of FIGURE 1 shows the displacement paths of both members.

Alongside the lower portion, there is pictorially represented the displacement of the image plane, magnified ten-fold. The ordinate values are those of the adjacently illustrated displacement paths of the two single lens components. In Table 3 below there are given specific values for such a system, when employed in an over-all system having a magnification range $V = -0.78$ to $-0.18$ and an overall length of 273.08 from object plane to image plane.

TABLE 3

| | | |
|---|---|---|
| $f_1 = +70.0$ | $l_0 = 136.0$ to $228.0$ | $V_1 = -1.06$ to $-0.44$ |
| $f_2 = +70.0$ | $l_1 = 120.18$ to $3.04$ | $V_2 = +0.74$ to $+0.42$ |
|  | $l_b = 16.90$ to $42.04$ |  |

Figure 2:
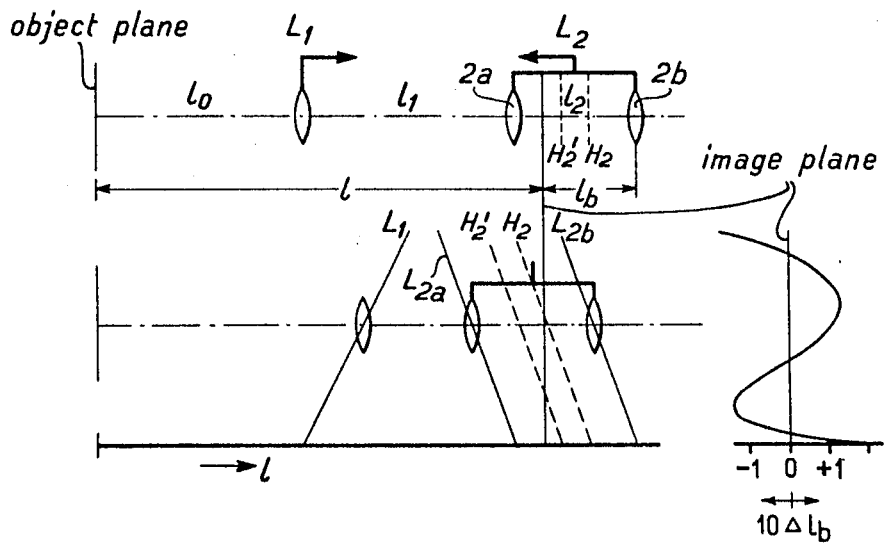
FIGURE 2 shows a system in which the second component consists of two individual elements.

In FIGURE 2, to which reference may now be had, there is schematically illustrated an embodiment of a system whose second component $L_2$ is composed of two individual elements $2a$ and $2b$. The principal planes $H_2$ and $H_2'$ lie between these two individual elements and upon displacement of component $L_2$ move so as to pass through the image plane. In the lower portion of FIG. 2, as in that of FIG. 1, there are represented the displacement paths of the components, as well as of the principal planes of component 2. Alongside the lower portion of FIG. 2, there are again illustrated the displacements of the image plane.

In Table 4 there are given specifics for a system according to FIG. 2 and having an overall system magnification range $V=-1.76$ to $-0.44$ and an overall length from object to image plane of 225.5.

TABLE 4

| | | | |
|---|---|---|---|
| $f_1=+60.12$ | $l_0=103.0$ to 154.0 | $P_1'=-1.40$ to $-0.64$ | |
| $f_{2a}=+150.0$ | $l_1=126.0$ to 17.65 | $P_{2a}'=0.89$ to 0.65 | |
| $f_{2b}=+150.0$ | $l_2=60.0$ | $P_{2b}'=1.41$ to 1.05 | $P_2'=1.26$ to 0.68 |
| | $l_b=-63.5$ to $-6.15$ | | |

Figure 3:
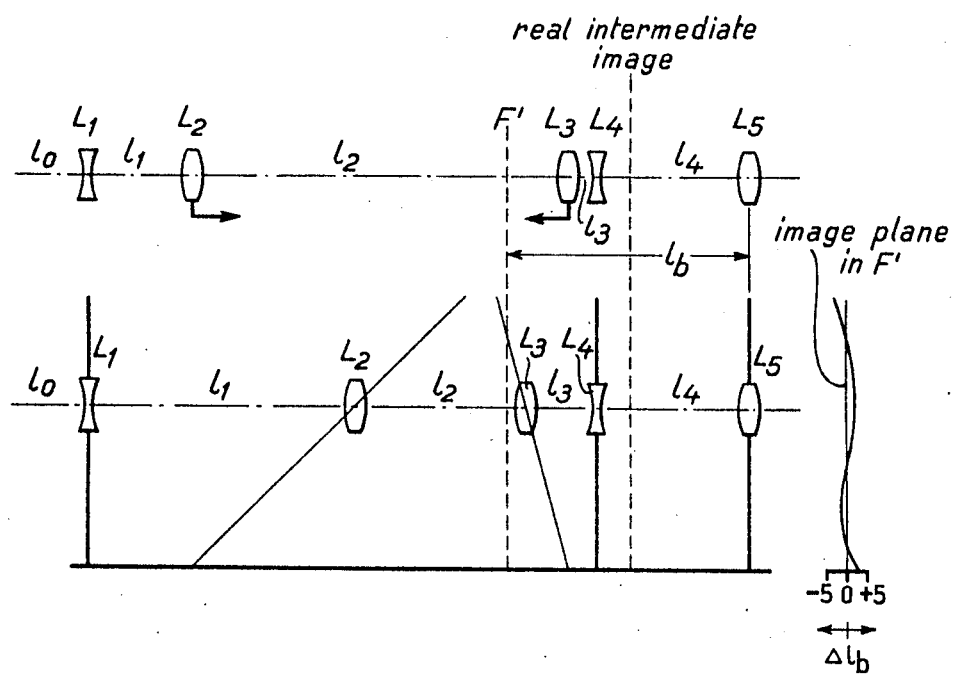
FIGURES 3 and 4 show applications of such systems, in conjunction with stationary components, as pancratic oculars for microscopes.

In FIG. 3, to which reference may now be had, there is illustrated a system according to FIG. 1, combined with three stationary components. The same reference designations are employed as in FIG. 1 except that in the instant case the pancratic portion of the system consists of $L_2$ and $L_3$. Component $L_3$ is adjusted relative to image plane $F'$. The location of a real intermediate image in the overall system is also indicated. In the lower portion of FIG. 3 there are again represented the displacement paths of the two components $L_2$ and $L_3$ and, alongside that lower portion, the displacement of the image plane at $F'$ in relation to the displacements of the said two members.

Table 5 below gives the boundary values for the focal lengths and spacings in such a system, consisting of three fixed and two adjustable lens components.

TABLE 5

| | |
|---|---|
| $0.5B<-f_1<1.3B$ | $0<l_1<1.3B$ |
| $0.3B<f_2<1.0B$ | $0<l_2<1.3B$ |
| $0.3B<f_3<1.0B$ | $0<l_3<0.5B$ |
| $0.2B<-f_4<0.7B$ | $0.15B<l_4<0.6B$ |
| $0.3B<f_5<1.0B$ | $0.2B<-l_b<B$ |

In the above table, B designates the spacing between the first member $L_1$ and image plane $F'$.

The parameters for a system having an overall length B of 105.814, a focal length range from 150.9 to 40.4 and a magnification range $V=1.66$ to 6.19 are given in Table 6 below.

TABLE 6

| | |
|---|---|
| $f_1=-83.9$ | $l_0=\infty$ |
| $f_2=+56.0$ | $l_1=26.5$ to 93.7 |
| $f_3=+56.0$ | $l_2=94.112$ to 8.544 |
| $f_4=-41.64$ | $l_3=7.242$ to 25.610 |
| $f_5=+60.0$ | $l_4=38.0$ |
| | $l_b=-60.04$ |

Figure 4:
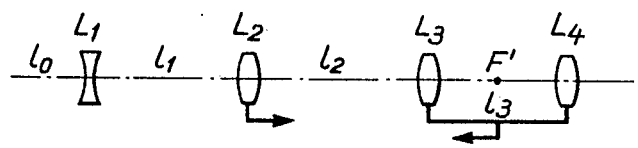

In FIGURE 4, to which reference may now be had, there is schematically illustrated a system like that of FIG. 2, but supplemented by one fixed component. The data given in FIG. 2 with respect to displacement paths and meanderings of the image plane also apply to FIG. 4. The boundary values of focal lengths and spacings for this system are given in Table 7 below, where B again denotes the spacing between the fixed lens $L_1$ and image plane $F'$.

TABLE 7

| | |
|---|---|
| $0.4B<-f_1<2.0B$ | $0<l_1<0.8B$ |
| $0.3B<f_2<0.8B$ | $0<l_2<0.95B$ |
| $0.7B<f_3<2.0B$ | $0.2B<l_3<0.8B$ |
| $0.7B<f_4<2.0B$ | $0<-l_b<0.8B$ |

Table 8 gives specific parameters for a system in which the overall length B, defined as above, is 134.63, the focal length range for the overall system $f=160.0$ to 39.71 and the scale of enlargement $V=1.56$ to 6.30.

TABLE 8

| | |
|---|---|
| $f_1=-90.87$ | $l_0=\infty$ |
| $f_2=+60.12$ | $l_1=12.13$ to 63.13 |
| $f_3=+150.0$ | $l_2=126.0$ to 17.65 |
| $f_4=+150.0$ | $l_3=60.0$ |
| | $l_b=-63.5$ to $-6.15$ |

Finally, two especially well corrected examples of systems in accordance with the invention are defined in Tables 9 and 10 below.

TABLE 9

| Radii | Thickness and Separations | $n_e$ | $\nu_e$ |
|---|---|---|---|
| $r_1=-60.01$ | $l_0=\infty$ | | |
| | $d_1=1.5$ | 1.5749 | 57.3 |
| $r_2=+32.428$ | $d_2=3.0$ | 1.6776 | 32.0 |
| $r_3=+124.901$ | $l_1=21.88$-85.24 | | |
| $r_4=+72.0$ | | | |
| | $d_3=5.0$ | 1.5749 | 57.3 |
| $r_5=-17.75$ | $d_4=2.0$ | 1.6776 | 32.0 |
| $r_6=-42.448$ | | | |
| $r_7=+30.048$ | $l_2=92.48$-11.80 | | |
| | $d_5=2.0$ | 1.6776 | 32.0 |
| $r_8=+15.14$ | $d_6=5.0$ | 1.5749 | 57.3 |
| $r_9=-276.29$ | | | |
| $r_{10}=-50.06$ | $l_3=2.52$-19.84 | | |
| | $d_7=1.5$ | 1.5749 | 57.3 |
| $r_{11}=+65.424$ | $l_4=34.84$ | | |
| $r_{12}=\infty$ | | | |
| | $d_8=1.0$ | 1.6776 | 32.0 |
| $r_{13}=+74.893$ | $d_9=3.0$ | 1.5749 | 57.3 |
| $r_{14}=-31.939$ | | | |
| | $l_b=-59.22$ | | |

$f_e=151.2$-42.8 $\quad V=1.65\times$-$5.84\times$.

TABLE 10

| Radii | Thickness and Separations | $n_e$ | $\nu_e$ |
|---|---|---|---|
| $r_1=-56.172$ | $l_0=\infty$ | | |
| $r_2=+38.939$ | $d_1=2.0$ | 1.5749 | 57.3 |
| | $d_2=1.7$ | 1.6776 | 32.0 |
| $r_3=+200.79$ | $l_1=8.49$-59.49 | | |
| $r_4=+54.028$ | $d_3=2.0$ | 1.6776 | 32.0 |
| $r_5=+20.223$ | $d_4=4.0$ | 1.5749 | 57.3 |
| $r_6=-61.046$ | | | |
| $r_7=+129.867$ | $l_2=121.79$-13.44 | | |
| | $d_5=4.3$ | 1.5749 | 57.3 |
| $r_8=-22.793$ | $d_6=2.0$ | 1.6776 | 32.0 |
| $r_9=-100.0$ | | | |
| | $l_3=56.96$ | | |
| $r_{10}=\infty$ | $d_7=2.0$ | 1.6241 | 36.1 |
| $r_{11}=-93.592$ | | | |
| | $l_b=63.44$-6.09 | | |

$f_e=159.95$-39.76 $\quad V=1.56\times$-$6.29\times$.

In each table of parameters herein the letters $r$ designate the successive radii of the lens components or their individual elements, as the case may be, the letters $d$ designate the successive axial thicknesses of these lenses or their elements, $l$ the axial spacings between the lenses and between the object and the lens nearest it, as well as between the image and the lens nearest it, $n_e$ the refractive index of the lens or lens element glasses, taken on the $e$-line, $\nu_e$ the Abbe number of these glasses, $f_e$ the focal length of the entire system and V its magnification.

I claim:

1. In an optical system for optical correction, the pancratic optical system which consists of a first lens component which is positioned on the side of the object plane and a second lens component consisting of a first and second rigidly interconnected individual lens element, both elements having positive, refractive powers, the common principal planes of said first and second individual lens elements lying between these two individual lens elements and being movable so as to pass through the image plane, said individual lens elements being displaceable only on both sides of the image plane, both the first and second lens component having positive, refractive powers and both said components being linearly displaceable relative to each other and being displaceable only between the respective planes throughout their movement, the first of said lens components being positioned on the side of the object plane and being adjustable through a position where said lens component provides a magnification range of about 1:1, and the second of said lens components being positioned only on the side of and displaceable away from said image plane, said optical system being capable of an overall magnification of 1 to 4.

2. In a pancratic optical system for optical correction, the pancratic optical system which consists of a first lens component which is positioned on the side of the object plane, and a second lens component which is positioned on the side of the image plane, both of said components having positive, refractive powers and both said components being linearly displaceable relative to each other, and being displaceable only between the respective planes throughout their movement, the first of said lens components being positioned on the side of the object plane and being adjustable through a position where said lens component provides a magnification range of about 1:1 and the second of said lens components being positioned only on the side of and displaceable away from said image plane, said optical system being capable of an overall magnification of 1 to 4, the second of said lens components being movable in the image plane of the first of said lens components and three stationary lenses, the first of said stationary lenses being a positive lens positioned nearest the image plane, the second of said stationary lenses being a negative lens positioned intermediate the first lens and the second lens component of the optical system, and the third of said stationary lenses being a negative lens positioned nearest the object plane, the first and second of said stationary lenses being so positioned that the real intermediate image is positioned intermediate said lenses, said optical system being capable of an overall magnification of 1 to 4.

3. The optical system of claim 1 which includes a stationary negative lens positioned intermediate the object plane and the first lens component.

References Cited

UNITED STATES PATENTS 3,185,029   5/1965   Peck et al. _____ 88—57

JOHN K. CORBIN, *Primary Examiner.*

U.S. Cl. X.R.
350—184, 220, 231